(Model.)
R. LINKLETTER.
DRIVE SCREW.
No. 494,681. Patented Apr. 4, 1893.
Fig. 1.
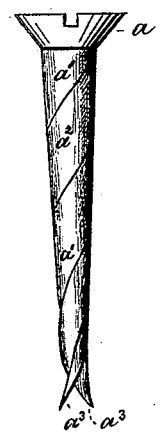
Fig. 2.
Fig. 5.
Fig. 3.
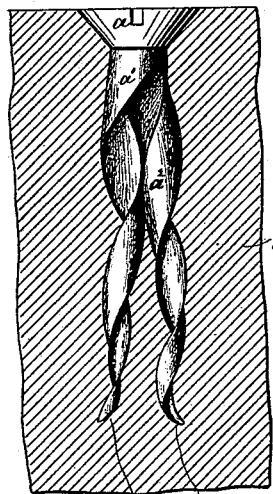
Fig. 4.
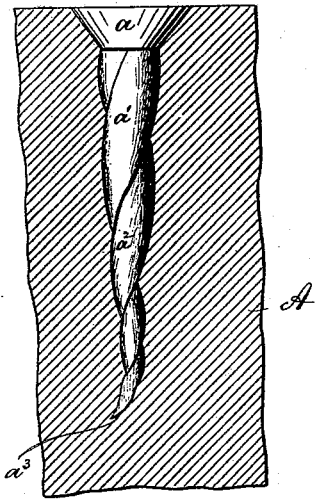
Fig. 6.
WITNESSES:
A. Schehl.
Wm. Schulz.
INVENTOR
Robert Linkletter
BY
Roeder & Briesen
ATTORNEYS.

UNITED STATES PATENT OFFICE.

ROBERT LINKLETTER, OF JERSEY CITY, NEW JERSEY.

DRIVE-SCREW.

SPECIFICATION forming part of Letters Patent No. 494,681, dated April 4, 1893.

Application filed July 29, 1892. Serial No. 441,578. (Model.)

*To all whom it may concern:*

Be it known that I, ROBERT LINKLETTER, of Jersey City, Hudson county, New Jersey, have invented an Improved Drive-Screw, of which the following is a specification.

This invention relates to a drive screw provided with two intertwisted spiral shank sections that will spread and uncoil as the screw is driven home.

The invention consists in the various features of improvement more fully pointed out in the claims.

In the accompanying drawings: Figures 1 and 2 are elevations of the screw, taken at right angles to each other. Figs. 3 and 4 are similar views showing the screw driven home. Figs. 5 and 6 are detail views at right angles to each other of the tip of one of the shank sections.

The letter $a$, represents the nicked head of the screw and $a'$, $a^2$, are the two sections of the split shank, which are connected to the head on top and are disconnected from each other at the bottom. The sections $a'$, $a^2$, are made in the form of a tapering spiral which when wound upon each other, form together a solid tapering shank. The sections $a'$, $a^2$, are at their lower ends provided with two bevels viz: an inwardly slanting bevel $a^3$, and a laterally slanting bevel $a^4$. The two inner bevels $a^3$, form a V-shaped groove between them (Fig. 1) and when the screw is driven home, they have a tendency to cause the shank sections to spread apart. The two lateral bevels $a^4$, extend in opposite directions on the two shank sections (Fig. 2) and they have for their object to cause the shank sections to revolve or unwind from each other. The result of the construction is that as the screw is driven into the wood A (Fig. 3) the shank sections will separate and uncoil to increase the diameter of the screw, which is thus firmly held in place.

When the screw is withdrawn in the ordinary manner by a screw driver, the shank sections will be gradually lapped one upon the other and the screw, when entirely out of the wood will have again assumed its normal appearance.

What I claim is—

1. A drive screw provided with two spirally coiled shank sections, wound one upon the other, each section terminating in a separate point, substantially as specified.

2. A drive screw provided with two spirally coiled shank sections wound one upon the other and having an inner bevel $a^3$, substantially as specified.

3. A drive screw provided with two spirally coiled shank sections wound one upon the other and having lateral bevels $a^4$, extending in opposite directions, substantially as specified.

4. A drive screw provided with two spirally coiled shank sections wound one upon the other and having the inner bevel $a^3$, and the lateral bevel $a^4$, substantially as specified.

ROBT. LINKLETTER.

Witnesses:
ANGUS MACSWEEN,
DANIEL G. MCKAY.